United States Patent [19]
Weiss et al.

[11] 3,794,838
[45] Feb. 26, 1974

[54] COMPENSATION MEANS FOR AMBIENT TEMPERATURE CHANGES OF A RADIATION CHOPPER IN A RADIOMETER

[75] Inventors: Morris Weiss, Stamford; Robert E. Buckley, Norwalk, both of Conn.

[73] Assignee: Barnes Engineering Company, Stamford, Conn.

[22] Filed: Feb. 10, 1972

[21] Appl. No.: 225,044

[52] U.S. Cl. ............................. 250/351, 250/352
[51] Int. Cl. ............................................ G01t 1/16
[58] Field of Search ............... 250/83.3 H, 351, 352

[56] References Cited
UNITED STATES PATENTS
3,392,282  7/1968  Astheimer ............... 250/83.3 H Primary Examiner—James W. Lawrence
Assistant Examiner—Davis L. Willis
Attorney, Agent, or Firm—Joseph Levinson

[57] ABSTRACT

A radiometer is provided with optics, a reference black body cavity, a radiation detector located at the apex of the black body cavity, a radiation chopper external to the black body cavity having alternate mirrored and open segments, and conventional electronic processing circuitry for receiving and processing an output signal from the radiation detector. A blackened vane is positioned in close proximity to the chopper for tracking the temperature of the radiation chopper, and extends into the field of view of the radiometer on the occurrence of an open sector of the chopper, with the area of the vane which extends into the field of view of the radiometer being equal to the clear aperture area of the optical means times the emissivity of the radiation chopper, which provides compensation for changes in the radiation chopper temperature.

5 Claims, 2 Drawing Figures

3,794,838

COMPENSATION MEANS FOR AMBIENT TEMPERATURE CHANGES OF A RADIATION CHOPPER IN A RADIOMETER

BACKGROUND OF THE INVENTION

The invention herein described was made in the course of or under a contract with the Department of the Navy.

Infrared radiometers have been used extensively for remotely measuring the temperature of objects utilizing the infrared radiation emitted therefrom. One form of a high accuracy infrared radiometer for temperature measurements is described in U.S. Pat. Nos. 3,039,006 and 3,097,300, which are assigned to the assignee of the present invention, and which have been used extensively for measurement of temperatures of surfaces, and for such airborne applications as the measurement of the temperature of the surface of the sea. Generally, radiometers of this and other types include radiation detection means, frequently in the form of an infrared detector, collecting optics to image the target on the detector, and chopping means which alternately pass radiation to the detector from the target and reflect radiation to the detector from a suitable reference source, which may be in the form of a black body reference cavity maintained at a predetermined temperature. Processing circuitry is connected to the infrared detector for receiving an output which is differential in form, in that it compares the radiation from the target with the radiation from a reference source, producing a final output which is the difference between the radiation intensity of the two sources and representative of the temperature of the target.

To obtain accuracy, what is desired is that the differential output signal produced be due solely to radiation from the target. However, since all objects above absolute zero emit radiation in the infrared, any changes in temperature of the elements or components of the radiometer, such as the optics, radiation chopper, cavity, and detector, will contribute an error in the measurement. Maintaining the temperature of the entire radiometer is difficult to implement, and costly. One approach to the problem is disclosed in U.S. Pat. No. 3,392,282, entitled "Automatic Method of Compensating Radiometers for Emissivity of the Optics." As the title indicates, this deals with compensating for changes in temperature of the optical means over wide ranges. It does not treat the problem of providing compensation for changes in temperature of a radiation chopper which is mounted externally of the reference cavity. As has been pointed out above, one method of compensating for temperature changes of the radiation chopper would be to mount it within the reference cavity and maintain its temperature. The problems of implementing this approach with respect to construction, alignment, repair, etc., place a limit on this type of approach.

Another way to correct for the error introduced by changes in the radiation chopper blade temperature would be to monitor the chopper temperature and inject a correction voltage proportional to that temperature to correct for the error. However, where there are large excursions in temperature of the chopper, for example on the order of over 100°C, the change in chopper radiance will be non-linear, making it difficult to inject the proper error signal. The chopper radiance depends approximately on the fourth power of temperature radiation law, which over short excursions would be linear, but over large excursions, the fourth power of temperature characteristic would show up. Furthermore, an electronic or error signal correction will be a function of the target read-out temperature, and therefore will be related to the slope of the black body curve at the observed target temperature. Thus, if the target temperature is very low, the error signal on a percentage basis would be much higher than for a target temperature which is considerably higher.

SUMMARY OF THE INVENTION

Accordingly, it is an object of the present invention to provide a new and improved radiometer for compensating for errors in changes in the temperature of a radiation chopper contained therein.

Another object of this invention is to provide a new and improved radiometer in which compensation for changes in ambient temperature of the radiation chopper of the radiometer is accomplished simply and radiometrically.

In carrying out this invention in one illustrative embodiment thereof, a radiometer is provided having a radiation detector, a radiation reference source, optical means for applying radiation from a field of view to the detector, and a radiation chopping means having alternate opaque reflective and transparent sectors alternately passing radiation from the field of view through the transparent sector of the chopper and radiation from the reference source to the radiation detector when an opaque reflective sector of the chopper blocks the field of view. Radiation chopper compensation means are provided for tracking the temperature of the radiation chopping means which is positioned with respect to the radiation chopping means such that it is in the field of view of the radiometer on the occurrence of the transparent sectors of the chopper and blocked therefrom on the occurrence of the opaque reflective sectors of the chopper.

DESCRIPTION OF THE PREFERRED EMBODIMENT

Figure 1:
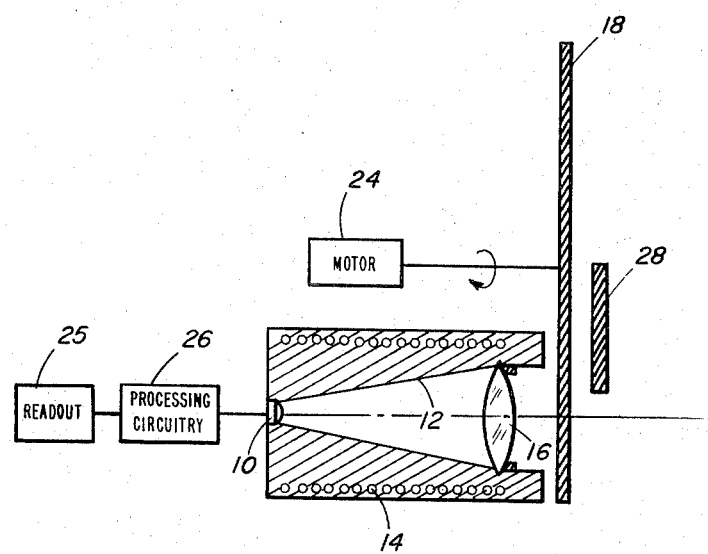
FIG. 1 is a schematic diagram of one form of radiometer employing the present invention.

Referring now to FIG. 1, the radiometer includes a radiation detector 10 which is capable of responding to radiation applied thereto, for the infrared region, for example, a thermistor bolometer. The radiation detector 10 is mounted at the apex of a reference black body cavity 12 having a temperature controlled electric blanket 14 for maintaining a predetermined temperature in the cavity 12. At the end of the cavity opposite the detector 10 is an optical means in the form of a lens 16 which images radiation from a field of view of the radiometer onto the focal plane of the radiation detector 10. Closely positioned near the end of the cavity 12 containing the lens 16 is a radiation chopper means 18 which is driven by motor 24. As will best be seen in FIG. 2, the radiation chopper 18 includes alternate opaque and transparent or open sectors 20 and 22, respectively. The surface of the opaque sectors 20 is highly reflective. The output of the detector 10 is applied to conventional processing circuitry 26 whose output is applied to a readout 25 in the form of a meter, recorder, chart indicator, etc. As the radiation chopper means 18 rotates, it functions to alternately pass radiation from a target in the field of view of the radiometer to the radiation detector 10, and then to reflect radiation from the thermostated reference cavity 12. The processing circuitry 26 produces a differential signal, namely the difference between the radiance of the reference cavity and that of the target, to present the signal to the readout representing the temperature of the target which is being measured.

It will be appreciated that when an opaque sector 20 of the chopper blade 18 blocks the cavity 12, the detector 10 will not only receive radiation from the black body cavity, but also any radiance coming from the chopper blade 18. Should the temperature of the chopper blade vary over a wide range, a large error would result, due to the chopper blade temperature change, since when the open sector 22 occurs, the detector 10 does not see the chopper and receives little or no radiation therefrom.

To alleviate this problem, a small blackened vane 28 is inserted into the detector 10 field of view which tracks the chopper 18 temperature. The vane 28 is located in close proximity to the chopper 18, as shown in FIG. 1. It may be mounted to the radiometer in any suitable manner, for example to the front dust cover or other instrument mounting.

Figure 2:
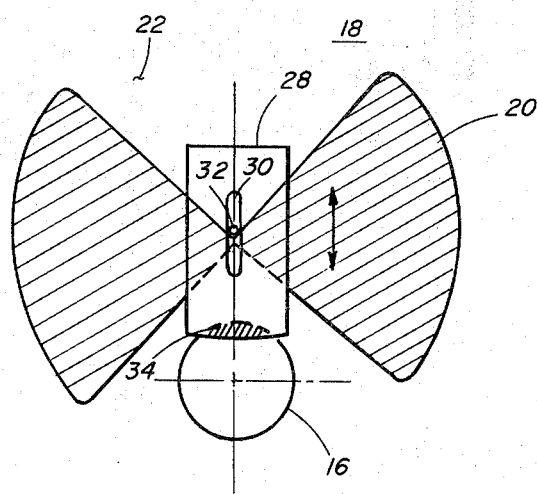
FIG. 2 is a vertical elevation of the chopper and compensation means illustrated in FIG. 1.

As will be seen in FIG. 2, the blackened vane has a slot 30 therein with a set screw 32 positioned in the slot for making the vane adjustable. The amount, or area 34 of the vane 28 which protrudes into the field of view of the detector as defined by lens 16 would be equal to the emissivity of the chopper blades 20 times the area of the clear aperture of the lens 16. The effect of the vane 28 is that when the chopper 18 is open, the detector 10 sees the vane 28 and receives radiation from it proportional to its area and temperature. As was pointed out, if the area 34 of the vane 28 is approximately equal to the emissivity of the chopper times the area of the aperture, the vane produces the same effect as the closed chopper does, so that no net radiance change occurs at the detector. Also, since the chopper temperature change will normally be much larger than the front lens 16 temperature change, the vane adjustment can also correct somewhat for the combination effect of both the lens and chopper emissivity.

This simple radiometric correction which is provided by the compensating vane in accordance with this invention eliminates the need for thermostatically controlling the temperature of the chopper, which is difficult. Also, the chopper remains on the outside of the black body cavity, allowing for easy assembly, alignment, and repair. Since the radiation chopper does not have to be enclosed in the cavity, the radiometer is simpler to construct, cheaper and easier to maintain, while providing high accuracy measurements which are not affected to a substantial degree by the problem of emissivity of a chopper whose temperature is changing over a wide range.

Although other changes and modifications varied to fit particular operating requirements and environments will be apparent to those skilled in the art, this invention is not considered limited to the example chosen for purposes of disclosure, and covers all changes and modifications which do not constitute departures from the true spirit and scope of this invention.

We claim:

1. A radiometer which compensates for changes in radiation chopper temperature comprising
   a. a radiation detector,
   b. a radiation reference source,
   c. optical means for applying radiation from the field of view of said radiometer to said radiation detector,
   d. radiation chopping means having alternate reflective opaque and transparent sectors for alternately passing radiation from said field of view through said transparent sector and radiation from said reference source to said radiation detector when said opaque sector blocks said field of view, and
   e. adjustable and lockable compensation means stationary in their locked position, said means being positioned in close proximity to and in substantially the same temperature environment as the said radiation chopping means which is positioned with respect to said radiation chopping means such that it is in the field of view of said radiometer on the occurrence of each said transparent sector and blocked therefrom on the occurrence of each said opaque sector of said radiation chopping means.

2. The radiometer set forth in claim 1 wherein said compensation means is a blackened vane.

3. The radiometer set forth in claim 2 wherein the area of said vane in its adjusted and locked position is located in the field of view of said optical means and equals the area covered by the entrance pupil of said optical means times the emissivity of said radiation chopping means.

4. The radiometer set forth in claim 2 wherein said radiation reference source is a temperature controlled cavity, said radiation detector means being positioned at the apex of said cavity and said optical means being positioned within said cavity opposite said detector means, and said radiation chopping means being positioned outside said cavity.

5. The radiometer set forth in claim 4 wherein the area of said vane located in the field of view of said optical means equals the area covered by the entrance pupil of said optical means times the emissivity of said radiation chopping means.

* * * * *